United States Patent
Chen et al.

(10) Patent No.: US 10,819,535 B2
(45) Date of Patent: Oct. 27, 2020

(54) METHOD FOR DATA PACKET TRANSMISSION AND/OR RECEPTION

(71) Applicants: Feng Chen, Feucht (DE); Franz-Josef Götz, Heideck (DE); Marcel Kießling, Welden (DE); An Ninh Nguyen, Nuremberg (DE); Jürgen Schmitt, Fürth (DE)

(72) Inventors: Feng Chen, Feucht (DE); Franz-Josef Götz, Heideck (DE); Marcel Kießling, Welden (DE); An Ninh Nguyen, Nuremberg (DE); Jürgen Schmitt, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 65 days.

(21) Appl. No.: 16/217,556

(22) Filed: Dec. 12, 2018

(65) Prior Publication Data
US 2019/0182075 A1    Jun. 13, 2019

(30) Foreign Application Priority Data
Dec. 13, 2017    (EP) .................................... 17207052

(51) Int. Cl.
| G06F 15/173 | (2006.01) |
| H04L 12/40 | (2006.01) |
| H04L 12/46 | (2006.01) |
| H04L 12/721 | (2013.01) |
| H04L 12/891 | (2013.01) |
| H04L 12/841 | (2013.01) |
| H04L 12/801 | (2013.01) |
| H04L 12/931 | (2013.01) |

(52) U.S. Cl.
CPC ...... *H04L 12/4625* (2013.01); *H04L 12/4015* (2013.01); *H04L 45/66* (2013.01); *H04L 47/13* (2013.01); *H04L 47/28* (2013.01); *H04L 47/41* (2013.01); *H04L 49/356* (2013.01); *H04L 2012/4026* (2013.01)

(58) Field of Classification Search
CPC ............... H04L 29/08072; H04L 29/06; H04L 12/2874; H04L 12/2801; H04L 47/12
USPC .......................... 709/220, 224, 226, 227, 228
See application file for complete search history.

(56) References Cited

U.S. PATENT DOCUMENTS

| 7,382,727 B2 * | 6/2008 | Yang .................... H04L 12/2801 370/232 |
| 9,497,663 B2 * | 11/2016 | Agardh ................. H04W 28/06 |

(Continued)

OTHER PUBLICATIONS

"Time-Triggered Ethernet—As-2d2 Deterministic Ethernet and Unified Networking", Sea Standard—Aerospace Standard—AS, SAE International Group, US, vol. AS6802, pp. 1-108, XP008178099; 2011.

(Continued)

*Primary Examiner* — Khanh Q Dinh
(74) *Attorney, Agent, or Firm* — Lempia Summerfield Katz LLC

(57) ABSTRACT

Methods and systems are provided for improved data packet transmission in a network bridge. Separate data packets received from a plurality of automation components are aggregated into a single data packet stream. The data packet stream is transmitted to another network node, for example, another network bridge.

20 Claims, 8 Drawing Sheets

(56) References Cited

U.S. PATENT DOCUMENTS

| | | | |
|---|---|---|---|
| 10,306,442 B1* | 5/2019 | Nuttall | H04L 67/34 |
| 2002/0114334 A1* | 8/2002 | Yang | H04L 12/2874 |
| | | | 370/395.1 |
| 2003/0149788 A1 | 8/2003 | Saint Etienne | |
| 2005/0286450 A1 | 12/2005 | Talanis | |
| 2008/0036593 A1* | 2/2008 | Rose-Pehrsson | G08B 25/00 |
| | | | 340/540 |
| 2010/0142540 A1* | 6/2010 | Matheney | H04L 12/2838 |
| | | | 370/400 |
| 2011/0082938 A1* | 4/2011 | Jaudon | G06F 9/451 |
| | | | 709/227 |
| 2011/0087771 A1* | 4/2011 | Breslin | H04L 43/12 |
| | | | 709/224 |
| 2013/0094447 A1* | 4/2013 | Gidlund | H04L 69/22 |
| | | | 370/328 |
| 2013/0170498 A1 | 7/2013 | Danielsson et al. | |
| 2015/0256356 A1 | 9/2015 | Armbruster et al. | |
| 2015/0282004 A1* | 10/2015 | Agardh | H04W 74/002 |
| | | | 370/328 |
| 2019/0132196 A1* | 5/2019 | Trivedi | H04L 41/0803 |

OTHER PUBLICATIONS

European Search Report for European Patent Application No. 17207052.6-1216 dated Feb. 8, 2018.

\* cited by examiner

METHOD FOR DATA PACKET TRANSMISSION AND/OR RECEPTION

CROSS REFERENCE TO RELATED APPLICATIONS

This application claims the benefit of EP17207052.6 filed on Dec. 13, 2017, which is hereby incorporated by reference in its entirety.

FIELD

Embodiments relate to a network bridge, a method implemented in a network bridge, and a computer program product.

BACKGROUND

Local area networks (LANs) are routinely deployed for providing network connectivity among stations confined to a limited area. A LAN typically enables connected stations to transmit data packets also called frames. Usually, such a frame includes an address identifying the receiving station or destination. The data transmission may be based on the Ethernet or IEEE 802.3 protocol. To extend the range of such networks layer 2 switches (bridges) are commonly used. In addition to layer 1 functions (signal amplification, forwarding) a bridge may extract address information so as to filter traffic.

The Institute of Electrical and Electronics Engineers (IEEE) came up with a standard (IEEE 802.1Q) defining the operation of layer 2 VLAN bridges that permit the definition, operation and administration of virtual LAN, VLAN, topologies within a bridged LAN infrastructure. Within the IEEE 802.1Q concept spanning tree algorithms are employed to provide for loop-free transmission of data. As LANs should be enabled to service different types of traffic there is a need to enhance bridges with the ability to differentiate between different service classes of traffic. A suitable way to define traffic types or service classes is to provide for identifiers or labels in frame headers that govern the treatment by individual bridges. Hence, by way of a network path as well as bandwidth and/or resource reservation a stream of data packets between a talker, the source of the stream, and a listener, the destination of the stream, may be established.

Furthermore, for example from patent application publication US 20150256356 A1 methods are known that are based on synchronized communication among the network nodes. Time slots may be defined for the data interchange between prescribed communication partners. Such time slot methods require sophisticated synchronization and special hardware devices. Therefore, patent application publication US 20150256356 A1 proposes a communications network that includes a plurality of virtual networks, that are implemented in the communications network in such a manner that each of the network devices is coupled to the communications network via at least two virtual networks.

Specific protocols, such as Industrial Ethernet, for data packet transmission in industrial applications have been developed. Such protocols, as e.g. PROFINET, may also function according to one or more of the IEEE 802.3 standard specifications. In particular PROFINET makes use of the IEEE 802.1Q data packet structure. That is to say, in addition to the Ethernet standard frame part, including e.g. the preamble and the source and the destination address, a PROFINET specific frame part may be added that includes a Frame ID, Status Information and process data.

If automation components are communicatively coupled using one or more of the above, protocols or other suitable protocols may be used for communication between the automation components. Thus, a protocol adaptation and/or conversation may be necessary in order to avoid communication failure and to exploit the full potential of the protocols being employed.

Communication between one or more automation components may occur by way of data packet transmission and/or reception, that is to say, by exchange of one or more data packets. Automation components may encompass process devices such as sensors, actors and monitors or control devices. The above mentioned PROFINET protocol employs cyclic data communication. Within PROFINET different protocol levels are defined, i.e. TCP/IP for non-time critical communication, RT (Real-Time) for time critical applications with 10 ms cycle times and IRT (Isochronous Real-Time) with cycle times of less than 1 ms. In addition, different automation components may possess different update cycles. For example, a motion control application may have update cycles much smaller than for example a process control application for monitoring flow and/or fill level.

Thus, if networks employing different protocols and/or different devices possessing different update times are used in an industrial application a mismatch between the respective cycle times and/or the respective update times may occur.

SUMMARY AND DESCRIPTION

The scope of the present disclosure is defined solely by the appended claims and is not affected to any degree by the statements within this summary. The present embodiments may obviate one or more of the drawbacks or limitations in the related art.

Embodiments mitigate the problem of mismatching times and provide an improved data packet transmission, for example between networks having different cycle times and/or devices including different update times.

Embodiments provide a method that is implemented in a network bridge, including and/or initiating an aggregation of separate data packets received from a plurality of automation components into a data packet stream. A single data packet stream may be used. The method may further include transmitting the data packet stream to another network node, for example to another network bridge.

A network bridge may thus be communicatively coupled to one or more automation components, such as e.g. a data packet source, where data packet transmission starts, and/or a data packet destination, where data packet transmission ends. A bridge may be connected to one or more other bridges. Furthermore, a bridge may be connected to one or more process control systems.

Embodiments further provide a network bridge configured to perform data packet transmission and/or reception.

Embodiments further provide a computer program product is provided that includes program code that when executed performs data packet transmission and/or reception.

DETAILED DESCRIPTION

Figure 1:
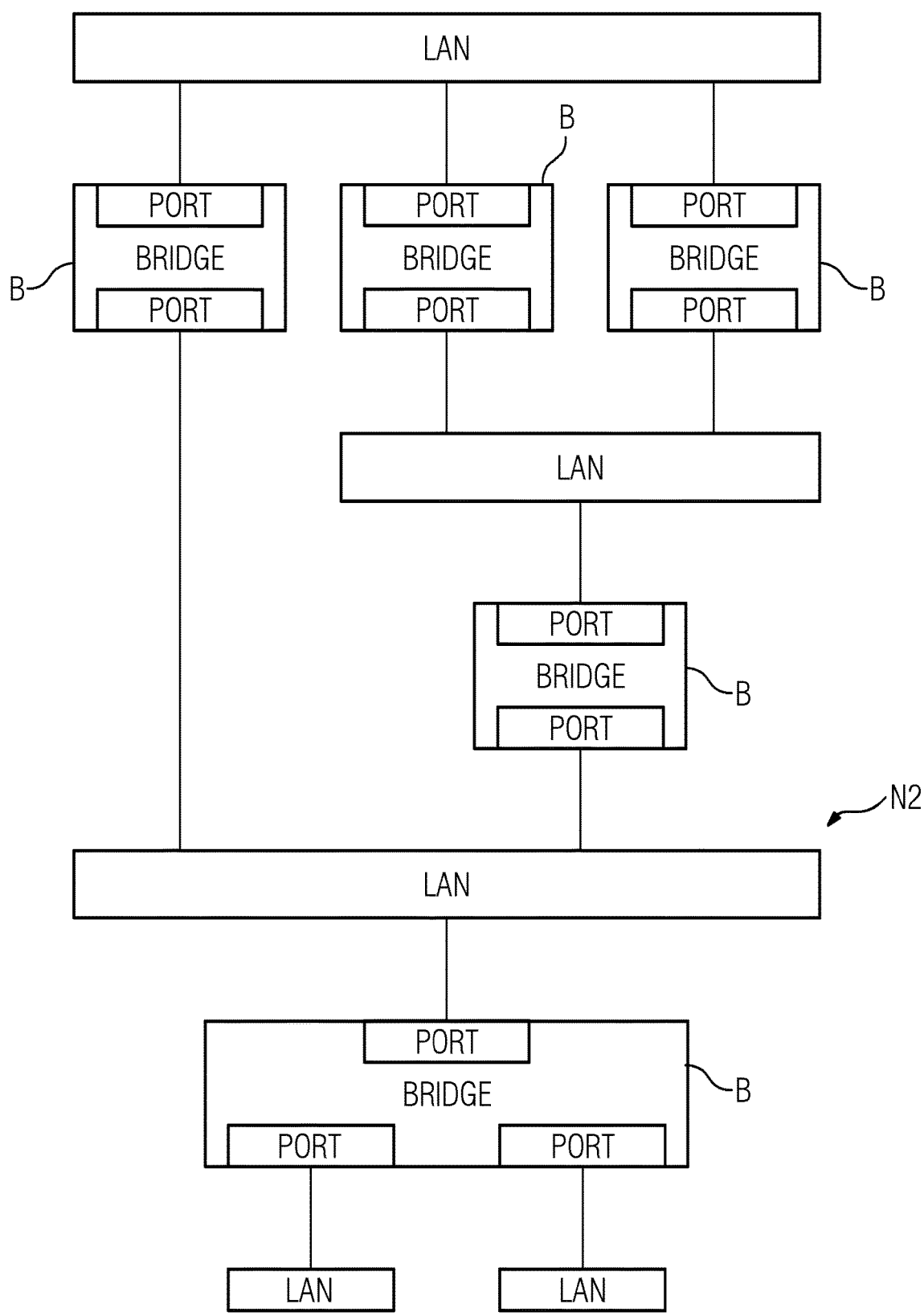
FIG. 1 depicts an example schematic representation of a bridged network.

FIG. 1 depicts a concatenation of individual networks, which according to the present embodiment are IEEE 802 Local Area Networks (LANs), interconnected by bridges B, i.e. a bridged network, N2.

The operation of a bridge B may include relay and filtering of frames, maintenance of the information required to make frame filtering and relaying decisions and/or management of the previously stated functions. A bridge B may further on relay individual data packets, also called frames, for example, in the context of Ethernet, between the separate Media Access Controls, MACs, of the individual LANs connected to its ports.

A more detailed description including inter alia a bridge architecture is available in "IEEE Standard for Local and metropolitan area networks—Bridges and Bridged Networks", IEEE Std 802.1Q™-2014 (Revision of IEEE Std 802.1Q-2011), ISBN 978-0-7381-9433-2. The standard also specifies protocols, procedures, and managed objects to support the Multiple Registration Protocol (MRP). MRP allows participants in an MRP Application to register attributes with other participants in a Bridged Network. MRP allows registration of one or more streams and configuration of associated network resources. Instead of MRP any other protocol allowing for streams to be established and/or transmitted may be employed. Thus, such a protocol allows to provide quality of service (QoS) for streams in bridged networks N2 by reserving resources within each bridge B along the streams' paths.

A data packet stream, or stream, may be defined as a unidirectional flow of data (e.g., audio and/or video, or process data), e.g. in the form of one or more data packets, from a talker (source) to one or more listeners (destination). However, with regard to industrial applications, such as process automation or factory automation, the preferred content of the data packets and thus of one or more the data packet streams is process data, such as one or more measurement values, device settings, such as parameters and/or software. A stream of data packets may be required to be delivered within a bound latency. Also, one or more streams may be established between one talker and multiple listeners, e.g. multicast streams may be utilized. Multicast streams are often sent to multiple destinations along multiple paths through the network N2, and a unicast stream normally travels along a single path.

In order for a network station to successfully participate in the transmission and reception of time-sensitive streams, it is necessary for the behavior of the network station to be compatible with the operation of the forwarding and queuing mechanisms employed in bridges.

A stream may be identified by its identification, e.g. a StreamID according to IEEE Std 802.1Q™-2014 (Revision of IEEE Std 802.1Q-2011), and/or by its source and/or destination address, and/or the stream's specific parameters such as its data packet parameters, Tspec, priority and/or rank, and/or its accumulated latency. Especially for Time-Sensitive-networking, TSN: Identification on the Control plane may be done based on the Stream ID. Data Frames may be identified by the unique destination address, their V-LAN ID and DataFramePriorit and/or one or more other data packet parameters Since a stream's identification may be uniquely assigned to a data packet stream (within the entire bridged network), a single data packet stream may be understood as a data packet stream that has a unique stream identification, e.g. a unique StreamID. Furthermore, a stream may be characterized by the maximum frame size or maximum data packet size a data packet source is allowed to produce. Also, one or more data streams may include a bandwidth assigned to them. Bandwidth may be understood as the bit-rate of available or consumed information capacity expressed in metric multiples of bits per second. For AVB, bandwidth is characterized by frame size, frames per interval and interval length.

With the further development of Audio-Video-Bridging, AVB, to Time-Sensitive-Networking, TSN, a further reduction of latency for industrial applications was achieved. AVB stream frames are sent with a specific frequency. For a stream reservation, SR, class A the minimum packet frequency is 8 kHz (125 µs) and for SR class B 4 kHz (250 µs). The frequencies are used for the bandwidth reservation. Multiples of the frequencies may be used and it is not required that a stream frame is sent in every transmission period, e.g. if a stream with an 8 kHz packet frequency is reserved, it is also allowed to send less than 8000 stream frames in a second (e.g. necessary for rate adaptive codecs). The so called "class measurement interval" defines acceptable Talker behavior with respect to per-stream transmission, cf. L.2 and 34.6.1. of IEEE Std 802.1Q™-2014 (Revision of IEEE Std 802.1Q-2011). The low transmission times of AVB/TSN fit very well with the latency requirements of certain industrial applications like motion control.

One or more of the LANs depicted in FIG. 1 may be set up in accordance with the above-mentioned standards. Thus, one or more LANs may be interconnected in order to allow for a data packet stream to be transmitted. The one or more bridges connecting two respective LANs may thus be configured accordingly. Bandwidth and/or resources for one or more data packet streams to be forwarded by the one or more bridges may be reserved, e.g. by way of the Stream Reservation protocol, SRP. Also, a data packet stream may originate at a first bridge B and may be forwarded by another bridge B of the network N2. The first bridge B may be connected to a network N1.

Figure 2:
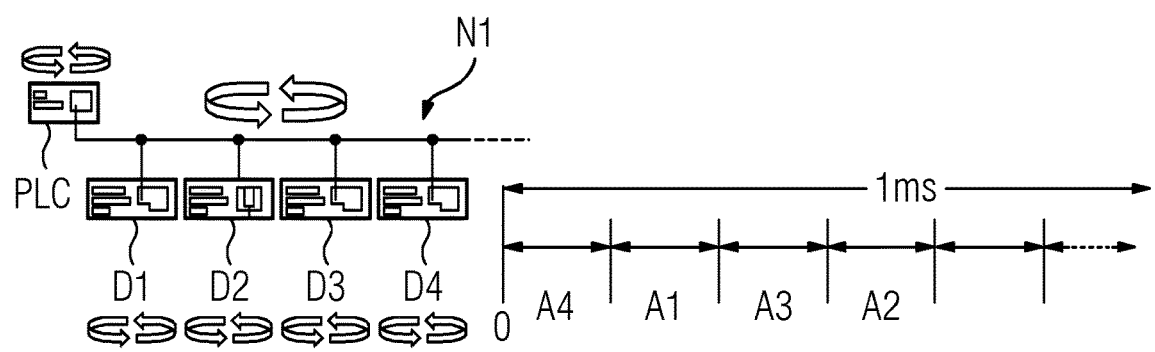
FIG. 2 depicts an example schematic representation of a first industrial network.

FIG. 2 depicts a schematic representation of a first network N1. The network N1 may make use of the Ethernet protocol and the respective data frame structure, e.g. for data packet transmission/reception from a central unit such as a programmable logic controller, PLC, e.g. an industrial digital computer. Data packet transmission between automation components such as sensors and or actors takes place in a cyclic manner. The individual update cycles are depicted by the circular arrows as shown in FIG. 2. A PLC may include a different update cycle for running an application than is supported by the protocol connecting the individual automation components D1, D2, D3 and D4. In addition, process automation processes may be much slower than for example motion control processes for which positioning and/or rotation has to be controlled on a millisecond, ms, basis. Process automation components may include an update time of up to 512 ms. Hence, the update times supported by the different devices may differ by several orders of magnitude. The different update times of the automation components are depicted by way of the individual circular arrows of the devices D1, D2, D3 and D4. For example, in a PLC a cycle may typically initiate the automatic update of the process image and/or the execution of a (cyclic) program.

Industrial applications function according to update times or cycles. For example, in IT communication cycle times of less than 100 ms typically occur, whereas for real time traffic, which is often required in industrial applications, cycle times below 10 ms are usually required, e.g. in the realm of factory automation. Other specific applications, e.g. for motion control, may even require cycle times less than 1 ms. For PROFINET IRT the "class measurement interval" has even been reduced to 31.35 kHz (32 µs). Throughout the present description the terms data packet and frame are used interchangeably.

An example application update time or cycle is also depicted in FIG. 2. The example cycle has a length of 1 ms. An individual slot A1, A2, A3, A4 is assigned to each of the process devices D1, D2, D3 and D4. In the present example four slots are present in one cycle. A cycle may also include unused slots or time spans during which no data packet transmission occurs. By way of the slots and the numbering of the slots a time distribution of data packet transmission in the first network N1 may be achieved. Each process device D1, D2, D3 and D4 may only be allowed to transmit one or more data packets during its dedicated slot. The slots in the embodiment in FIG. 2 include equal length. The length may be set to 125 µs as shown in FIG. 2.

Transmission of the one or more data packets in the first network N1 may be performed according to the PROFINET as explained above. However, communication according to PROFINET RT may not be synchronized. Even though the different devices in the PROFINET RT network transmit data according to a cycle, the individual cycles are not synchronized. In addition, processing time of a software application, e.g. running in the PLC, data sampling by the automation components and the communication cycle of the protocol deployed on the network may be different. It is only for IRT that processing time of the software application, e.g. running in the PLC, data sampling by the automation components and the communication cycle of the protocol deployed on the network are synchronized. However, for IRT to be deployed the network topology has to be preconfigured and the network stations, e.g. the devices, have to include IRT-capabilities. Furthermore, the software application should be able to match the common communication cycle.

Figure 3:
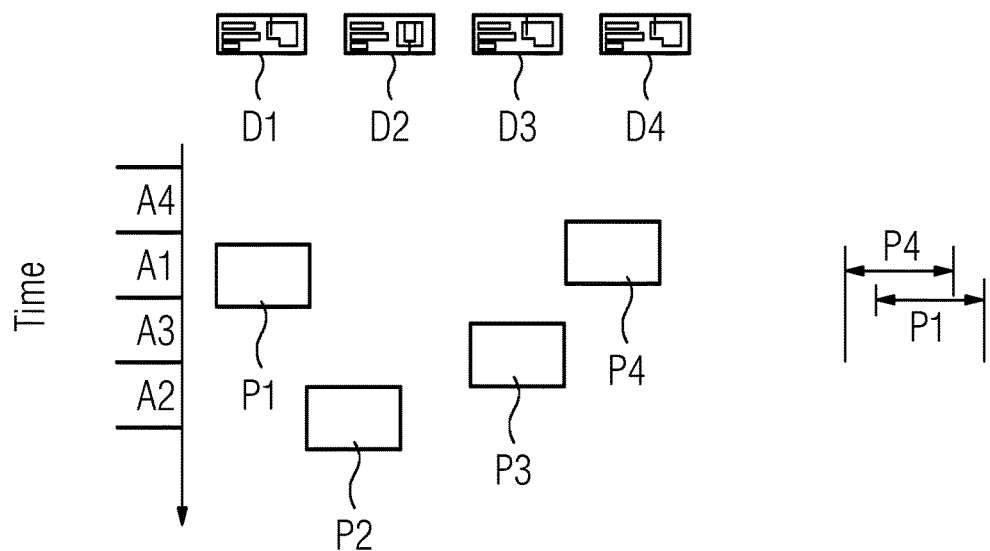
FIG. 3 depicts an example schematic representation of data packet transmission in an industrial network.

In an unsynchronized network, such as PROFINET RT, data packet transmission of different automation components, such as process devices D1, D2, D3, D4, may overlap. Such a scenario is depicted in FIG. 3. As depicted, even though different devices D1, D2, D3, D4 may only transmit their data packets during different slots A1, A2, A3, A4, the transmission of one or more data packets of device D4 and D1 partially overlap since the starting points of a cycle is not synchronized among the devices D1, D2, D3, D4. This may also be due to the different path length the one or more data packets may have to travel through the first network N1. One or more data packets P4, P1 of devices may overlap when transmitted on the network N1. However, devices may be connected to different ports of a bridge, cf. FIG. 1. Consequently, insufficient bandwidth may not be reserved by bridge in Network N2 for forwarding the one or more data packets. Thus, due to the unsynchronized transmission and subsequent reception problems may occur when forwarding the one or more data packets P1, P2, P3, P4 at the time they arrive at one or more bridges B connected to the first network N1. This may e.g. be due to the limited bandwidth and/or storage reserved for a data packet stream to be forwarded by a network bridge. Hence the transmission of the one or more data packets P1, P2, P3, P4 may cause congestion in the second network N2 or data packet loss may occur since not enough resources to the store the arriving data packets may be available in one or more of the bridges of the first and/or the second network N1, N2.

Figure 4:
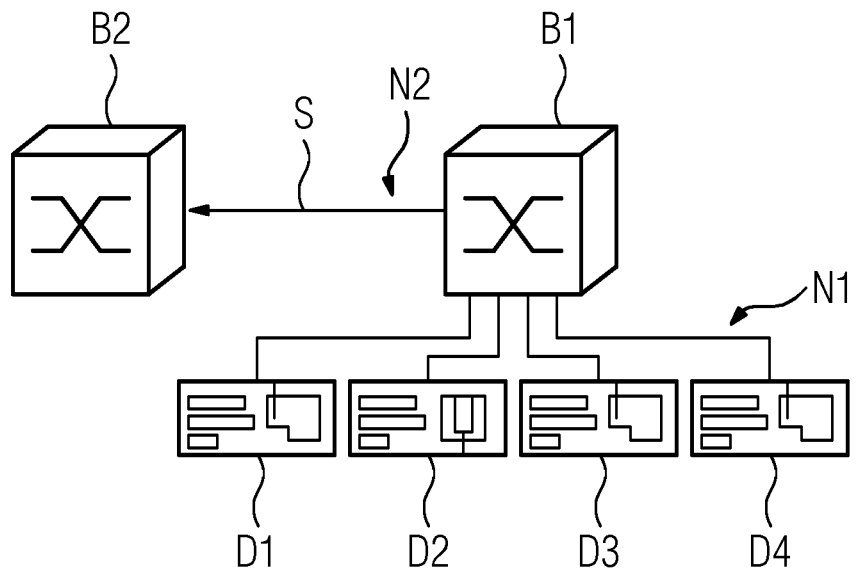
FIG. 4 depicts an example schematic representation of network bridges for data packet transmission.

In FIG. 4, a network bridge B1 is depicted that is connected to one or more automation components, in this case process devices D1, D2, D3, D4, that may be connected via individual port to bridge B1. Bridge B1 and the process devices may form a first (sub-)network N1. A bridge B1, B2 may be configured to forward the one or more data packets P1, P2, P3, P4 by way of a (single) data packet stream S to another bridge B2 or a subscriber of the stream. For example, with industrial applications an automation component may be a process device such as a sensor or actor or the like. Even though a star topology of network N1 is depicted in FIG. 3, the process devices D1, D2, D3, D4 may be connected in another type of topology with the network bridge B1. For example, the topology according to FIG. 2 may be chosen. When the data packets from the respective process devices D1, D2, D3, D4 arrive at the network bridge B1, the network bridge B1 aggregates the data packets and transmits the data packets as a single data packet stream S to the next network station in the second network N2. The next network station may be another network bridge B2 or subscriber to the data packet stream S. The data packet stream S generated by the bridge B1 may thus include data packets P1, P2, P3, P4 from different process devices D1, D2, D3, D4. The data packet stream S is then separated into the respective data packets for the individual devices D1, D2, D3, and D4 at the one or more destination, e.g. the one or more subscribers, of the data packet stream. For example, the destination of the data packet stream S may be a PLC or a network bridge. Hence, instead of individual data packet streams, e.g. one for each process device D1, D2, D3, D4, a single data packet stream S for multiple process devices D1, D2, D3, D4 is provided. Thus, for example all or part of the automation components of the first network N1 may be combined in a single data packet stream S in which the data packets from the automation components are aggregated. The network bridge B1 may aggregate (individual) data packets P1, P2, P3, P4 received from a plurality of automation components into a (single) data packet stream S. The (single) data packet stream S may be transmitted to another network node, for example, to another network bridge B2. Further automation components, not shown, may be connected to bridge B2 and data originating from the further automation components may also be transmitted as a single data packet stream, different from the data stream from bridge B1, via the network N2. Thus, a first data packet stream including one or more data packets originating from automation components connected to bridge B1 and a second data packet stream including one or more data packets originating from automation components connected to bridge B2 may be transmitted via network N2 to one or more stream destinations. For example, a central unit such as a programmable logic controller, PLC, e.g. an industrial digital computer may be the common destination of both data packet streams.

The network bridge B1 may receive a first data packet of the (individual) data packets during a first reception duration. The first data packet is transmitted from a first automation component of the plurality of automation components (via first Ethernet-based (sub-)network. Consequently, the first automation component may transmit the first data packet according to a time slot (cf. FIG. 2 and FIG. 3) assigned to the first automation component. The network bridge B1 may receive a second data packet of the data packets during a second reception duration. The second data packet is transmitted from a second automation component of the plurality of automation components (via first Ethernet-based (sub-)network). Hence, whereas transmission/reception in the first Ethernet-based (sub-)network occurs in a cyclic manner according to a preconfigured application cycle, transmission/reception in the second Ethernet-based (sub-)network occurs via one or more data packet streams.

The transmission/reception duration of the data packets in the first Ethernet-based (sub-)network corresponds to time slots assigned to the respective automation components in first Ethernet-based (sub-)network. The reception of the separate data packets in the first network N1 may occur in an unsynchronized manner, as described in connection with FIG. 3. Thus, the time slots and the cycles are not synchronized between the automation components. Furthermore, a network bridge may temporarily store data packets received, for example, the first and the second data packet, in one or more data packet queues, e.g. for different classes of data packets (independent for automation components).

As well as the application cycle the data packet stream includes a plurality of, for example cyclically repeating, transmission windows. When aggregating the data packets, the separate data packets are arraigned evenly in one or more of the pluralities of transmission windows. A shaping mechanism may further be employed that at least partially, for example evenly, fills the transmission windows of the application cycle with the data packets received from the plurality of automation components.

Figure 5:
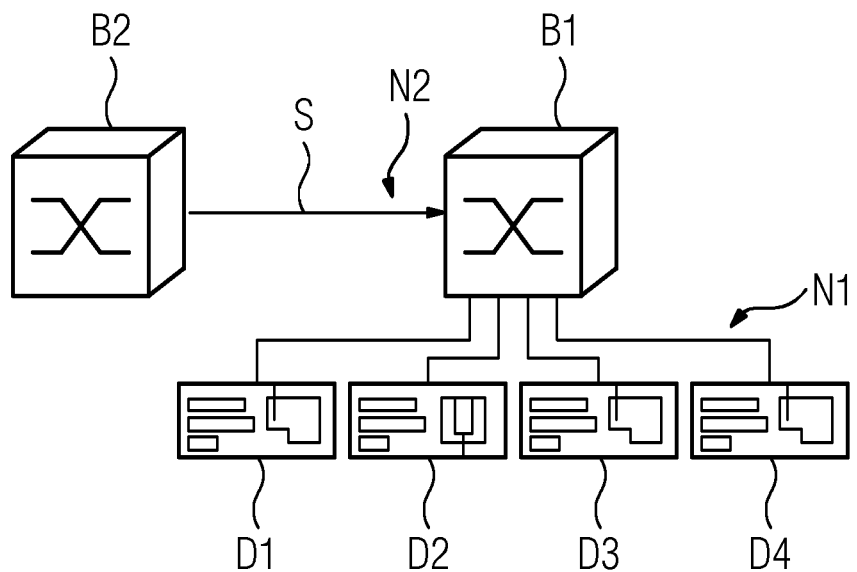
FIG. 5 depicts an example schematic representation of network bridges for data packet reception.

In FIG. 5, a network bridge B1, that may include the functions as described in the above for example in connection with FIG. 4, may receive a data packet stream from another network station, such as bridge B2. The data packets of the data packet stream S are destined for reception by the process devices D1, D2, D3 and D4 connected to network bridge B1. The data packets for process devices D1 to D4 are aggregated in a single data packet stream S. Bridge B1 may as well receive other data packets streams, not shown. When receiving the data packets of the data packet stream S bridge B1 may separate, or disaggregate, the data packet stream S into the individual data packets and forward the data packets to the respective process devices D1 to D4. The forwarding of the individual data packets may occur according to time slots for which transmission by the bridge is allowed. A time slot may be dedicated to specific automation component, such as a process device.

Figure 6:
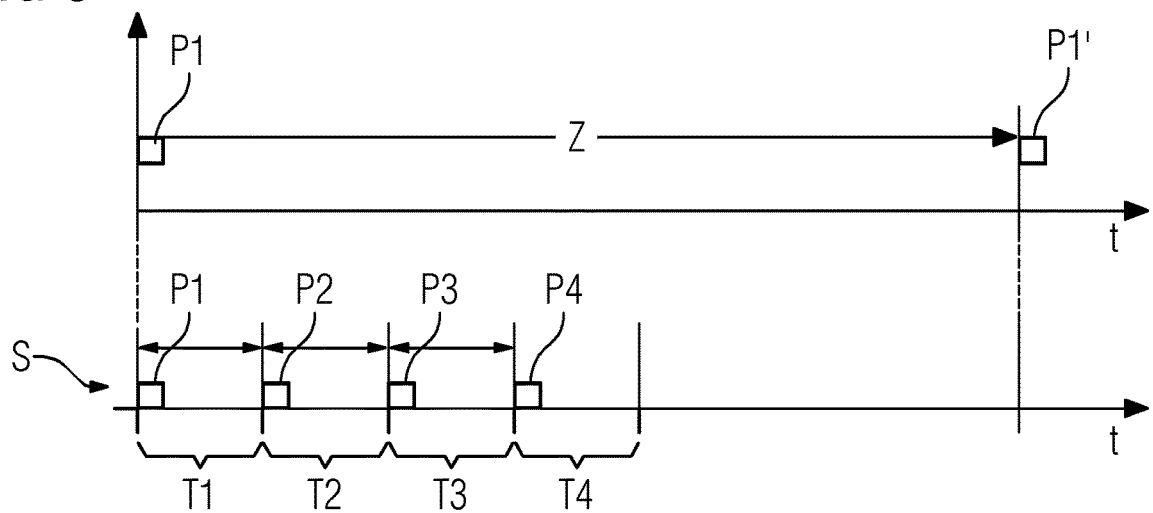
FIG. 6 depicts an example schematic representation of an application cycle and transmission windows for a data packet stream.

FIG. 6 depicts a comparison of an application cycle Z for transmission of one or more data packets P1, P1' on the first network, depicted in the upper row, and transmission windows T1, T2, T3, T4 of a data packet stream S on the second network, depicted in the lower row.

A first data packet P1 transmitted on the first network is depicted in the upper row as a square. The length of the square represents the transmission duration on the first network. The cycle Z according to which is transmission repeats is also depicted in the upper row of FIG. 6. During a first cycle a packet P1 is transmitted and during a following, second cycle a data packet P1' is transmitted. For the sake of simplicity, only one data packet is considered even though as e.g. described in connection with FIG. 2 multiple data packets of different automation components, such as process devices, may be transmitted during the application cycle Z of the first network. In the lower row transmission of a data packet stream S is shown. As is apparent by the examples provided in the above, for example in connection with PROFINET RT, one or more data packets may arrive simultaneously at a bridge. This may lead to congestion, increased latency and even data packet loss (for example in case the same protocol and protocol settings are employed in the second network).

In order to transmit one or more data packets P1, P2, P3, P4 of the data packet stream S, transmission windows T1, T2, T3, T4 are provided within the second network. Within a transmission window T1, T2, T3, T4 one or more data packets P1, P2, P3, P4 may be transmitted. Only a single data packet P1, P2, P3, P4 is depicted in each transmission window T1, T2, T3, T4. The number of data packets P1, P2, P3, P4 that may be sent during a transmission window T1, T2, T3, T4 —which is also called "class measurement interval"—may be set when defining the data packet stream S. For example, the data packet rate is measured over a class measurement interval that depends upon the stream reservation, SR, class associated with the stream. SR class A corresponds to a class measurement interval of 125 µs; SR class B corresponds to a class measurement interval of 250 µs.

For TSN a specific definition of a data packet stream S is provided in order to guarantee that a data packet stream S is transmitted within or with a certain latency. For slow applications, e.g. slow application cycles (in the first network), for example longer than 125 µs (which corresponds the first class measurement interval), more resources than needed are reserved within the second network if a data packet stream is set-up for each process device. For example, in the case of an application cycle Z of 1 ms a reservation that is 8-fold higher than actually needed in order to transmit the amount of data, e.g. one or more data packets, is made. In case of an application cycle of 512 ms a 4096-fold too high reservation would occur. Thus, it is proposed to aggregate the data packets arriving at the network bridge in a single data packet stream. Since the data packet still include, for example, a frame number etc. the data packets may be identified and the stream may be disaggregated into the individual data packets again.

The transmission window may be a fraction, for example a divisor, of the application cycle. Thus, in such a case the transmission window may be smaller than the application cycle. Thereby it would be guaranteed that one or more data packets of an application cycle are transmitted on the second network without delay. However, in such a case all of the data packets transmitted within such a large application cycle might potentially arrive at the same point in time at the bridge. In order to guarantee transmission even in this worst-case scenario a corresponding reservation of bandwidth has to be made.

The network bridge may possess a module, e.g. implemented by way of software, that gathers and/or aggregates one or more data packets of multiple automation components. Preferably one or more data packets received during one or more application cycles are gathered and/or aggregated by the module. The gathered and/or aggregated data packets are transmitted as a single data packet stream by the bridge. Thus, instead of a plurality of data packet streams, each dedicated to an individual automation component, a single data packet stream is created. In general data packets from different devices are gathered and/or aggregated to form a single data packet stream. For example, all the devices, and the respective data packets, connected to a network bridge may be combined to form a single data packet stream allowing for better use of the available resources of the network bridge. In the second network more than one data packet stream may be established which is beneficial in a process automation environment where relatively slower processes are controlled. The proposed gathering and/or aggregating of data packet of different devices to form a single data packet stream also allows to combine automation components with different application cycles. Hence, a data packet stream including one or more data packets of the first application cycle and one or more data packets of the second application cycle may be established. The first application cycle is shorter than the second application cycle. Thus, a transmission window for transmitting one or more data packet of the data packet stream in the second network is shorter in time then a first application cycle of a first automation component in the first network. Furthermore, the transmission window for transmitting one or more data packets of the data packet stream in the second network is shorter in time than the second application cycle of a second automation component in the first network. The one or more data packets of the first and second automation component in the first network are gathered and/or aggregated to form a single data packet stream in the second network.

The transmission window may correspond to the class measurement interval of 125 μs or 250 μs according to IEEE 802.1 Q. The application cycle of an automation component, for example the one shown in the upper row of FIG. 6, may be multiple milliseconds long and may include the indicated data packet. A data packet may include 228 bytes. The data packet may originate from a first automation component and may be sent each application cycle.

Figure 7:
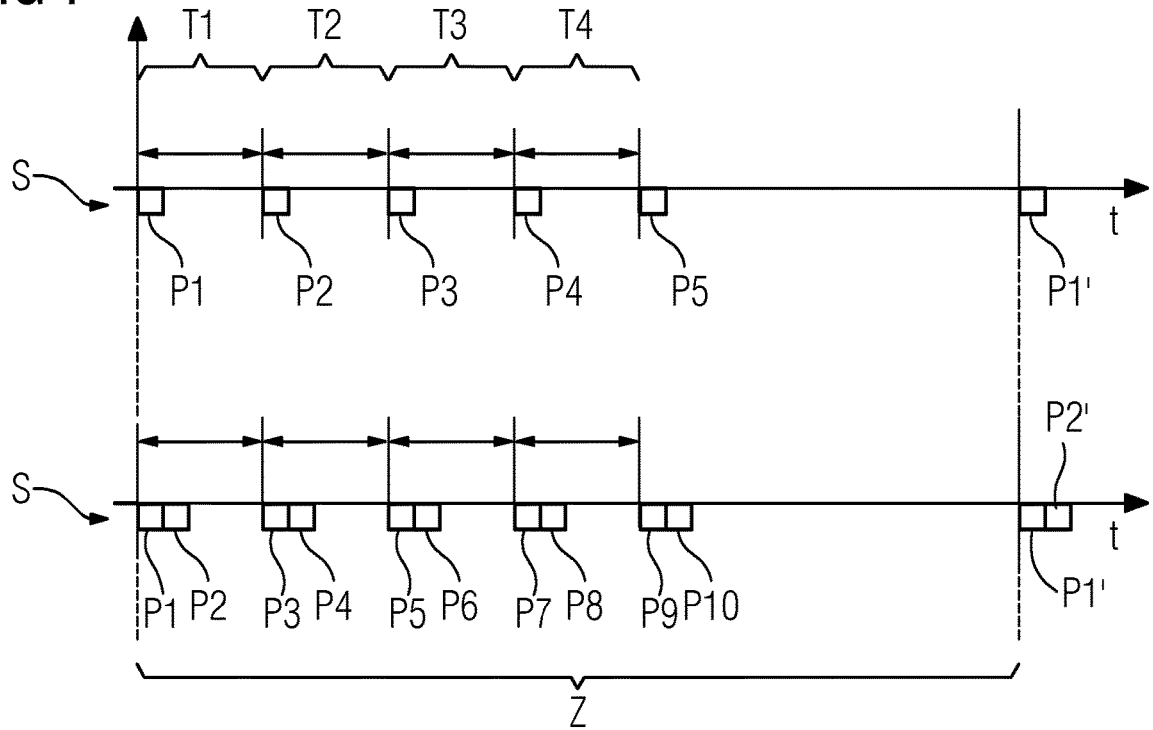
FIG. 7 depicts an example schematic representation of different data packet streams.

In FIG. 7, another example of a data packet stream including data packets of multiple automation components is depicted. Each data packet depicted in the upper row of FIG. 7 originates from a different automation component. The data packets are aggregated into a single packet stream. During each transmission window of the data packet stream at least one of the data packets is transmitted in the single data packet stream. After the duration of an application cycle data packet transmission repeats also within data packet stream. The data packet stream in the second communication network corresponds to the repeating sequence of application cycles in the first network. A data packet stream may include a fixed number of data packets within a transmission window, e.g. a maximum number of data packets that are allowed to be transmitted within a transmission window. The limit may be set or may be due to the physical restrictions of the medium. Thus, as depicted in the lower row of FIG. 7, multiple data packets may be present in a transmission window of the data packet stream. In order to maximize utilization of transmission window length, the number of data packets within a transmission window may be chosen as high as possible. Consequently, bandwidth and/or storage space for the data packet stream is optimized since due to the shorter transmission window length a single data packet stream may be used to transmit the one or more data packets of different origin.

In order to allow the one or more data packets of the data packet stream to be transmitted from its source to its destination within the second network, some buffer within the transmission window may be left unused (e.g. not dedicated to data packet transmission) within the transmission window.

Figure 8:
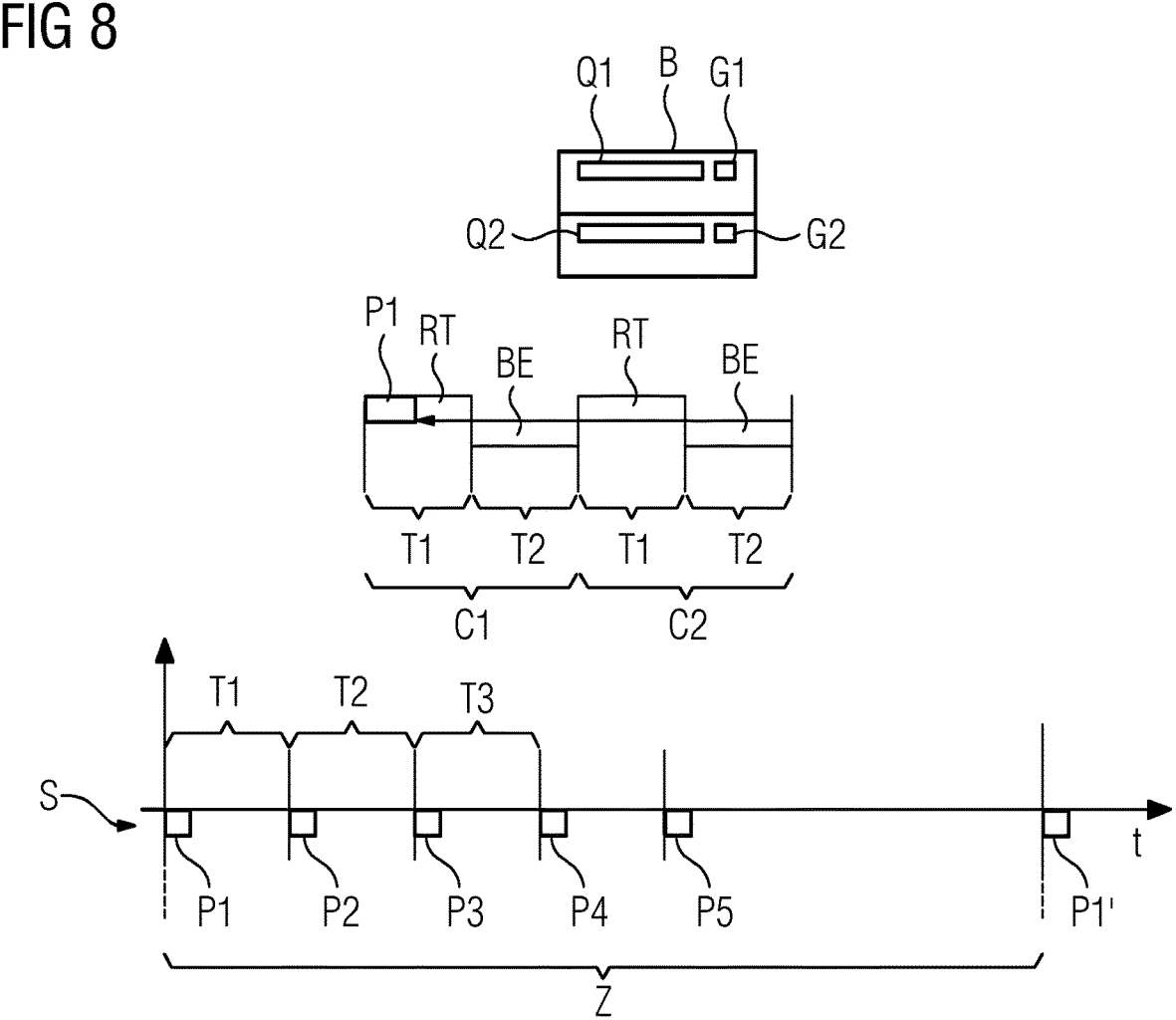
FIG. 8 depicts an example schematic representation of data packet queues in a network bridge and transmission of data packets in a data packet stream.

In FIG. 8 a first queue Q1 and a second queue Q2 for storing data packets of different traffic types within a network bridge are shown. One or more data packets arriving at the network bridge for example from the first network are stored according to their traffic type either in the first or in the second data packet queue. Subsequently, one or more data packets of a first traffic type, e.g. Real-Time traffic, RT, are transmitted during a first transmission window T1 and one or more data packets of the second traffic type, e.g. Best-Effort traffic, BE, are transmitted during a second transmission window T2. The first and second transmission window may be adjacent to each other. Thus, first and second transmission windows form a transmission schedule, indicated by C1 and C2 in FIG. 8. Further transmission windows beside the first and second window shown may exist and be part of a transmission schedule. Respective gates G1 and G2 may control transmission of the one or more data packets from the first and second data packet queue on the medium of the second network. Thus, one or more data packets arriving at the bridge via the first network may be stored in the first or second queue and may then be forwarded in the next available transmission window of the data packet screen in the second network.

Figure 9:
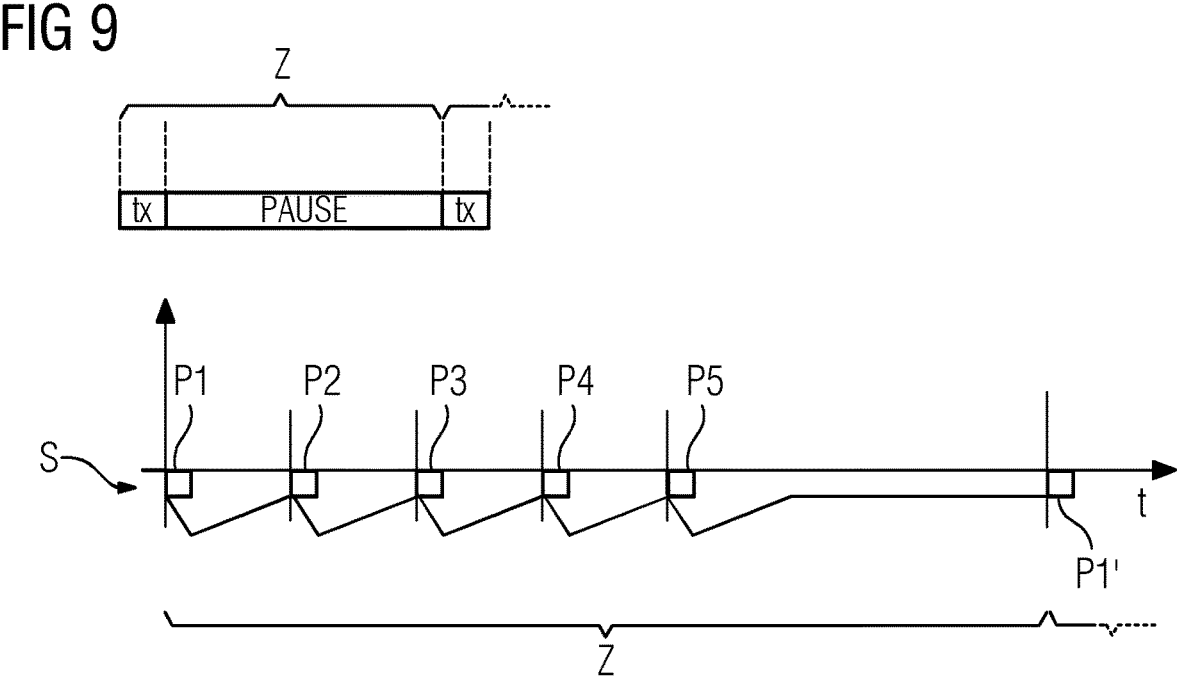
FIG. 9 depicts an example schematic representation of a data packet stream.

In FIG. 9, another embodiment of a data packet stream including data packets of different automation component is depicted. A credit-based shaper as known from IEEE 802.1Qav may be used to define the data packet stream. Thereby data packets may be spaced apart from each other as much as possible within the time span of an application cycle, e.g. a cycle Z, in order to reduce bursting and/or bunching of data packets in the second network. The mechanism also provides for one or more data packets received at the bridge to be forwarded and at the same time optimizing the resources used. Transmission selection and traffic shaping in IEEE 802.1Qav is organized by priorities and a credit-based shaping algorithm. The transmission of one or more data packets in a data packet stream is only allowed when the amount of available credits is greater or equal 0. An upper and lower bound of the credit-based shaper limits the streams bandwidth and burstiness. In FIG. 9, a first data packet P1 is transmitted and then transmission is paused until a second data packet P2 is transmitted (both within the same transmission window). In the case of multiple data packets, a distribution of data packets P1, . . . , P5 being equally spaced apart during a transmission phase, tx, of a cycle Z may result. Following the transmission phase, tx, of cycle Z, transmission may by paused until the end of cycle Z, e.g. because the data packet queue for transmission is empty.

Overall, the combination of data packets into a single data packet stream allows to make use of only one stream address and one data reservation in the second network. This provides for more applications to be run employing the same amount of resources in the second network and/or simplifying the network components, e.g. less storage and memory within a bridge.

Figure 10:
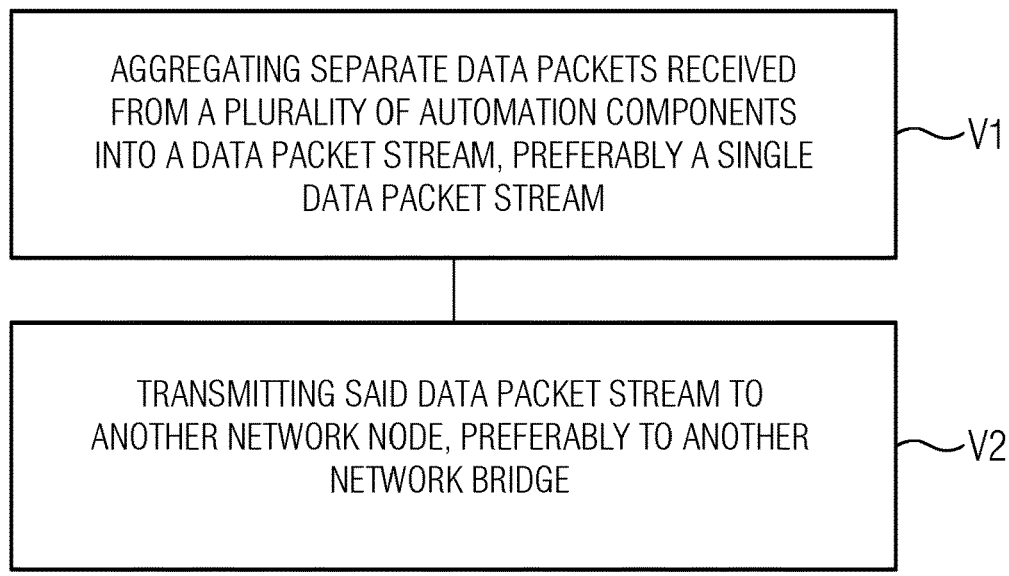
FIGS. 10 to 13 depicts example acts in a method for improved data packet transmission.

FIG. 10 depicts an example method according to an embodiment. In a first method act V1 data packets from a plurality of automation components are aggregated into a data packet stream, for example, a single data packet stream. In a subsequent act V2 the data packet stream is transmitted to another network node, for example to another network bridge.

As described above, the network bridge may aggregate the separate data packets into a single data packet stream and may be connected to a network N1 and may be connected to a network N2. The networks N1 and N2 may thus form sub-networks of a bigger network N. For example, the second network may be one or more of the LANs of FIG. 1 and the first network may be the network as depicted in FIG. 2.

The destination of the data packet stream may either be another network bridge or a process logic controller, PLC.

Figure 11:
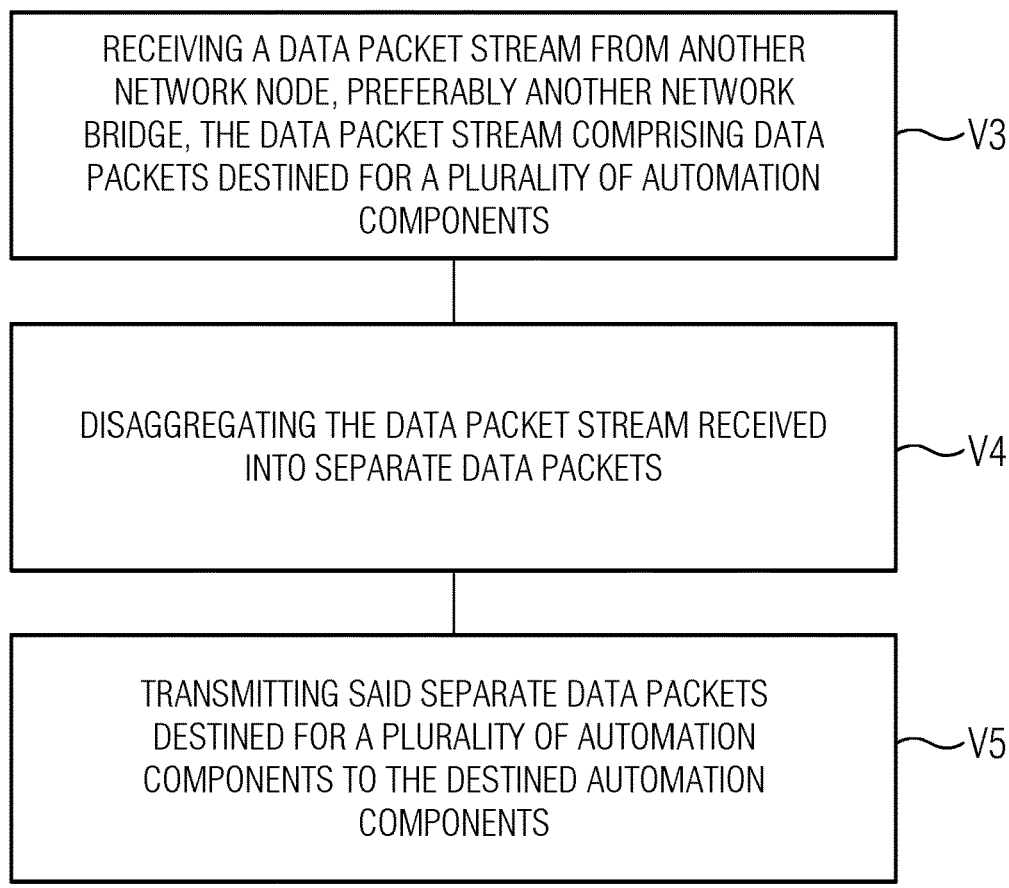

FIG. 11 depicts further acts. The acts may be combined with the acts of FIG. 10 or may be executed separately. In an act V3 data packet stream from another network node, for example, another network bridge, is received. The data packet stream may include data packets destined for a plurality of automation components. In a subsequent act V4 the data packet stream received is disaggregated into separate data packets. The separate data packets that are destined for plurality of automation components are then transmitted in act V5 to the destined automation components.

The act of transmitting the separate data packets occurs on network N1 and that the act of transmitting the data packet stream occurs on network N2.

Figure 12:
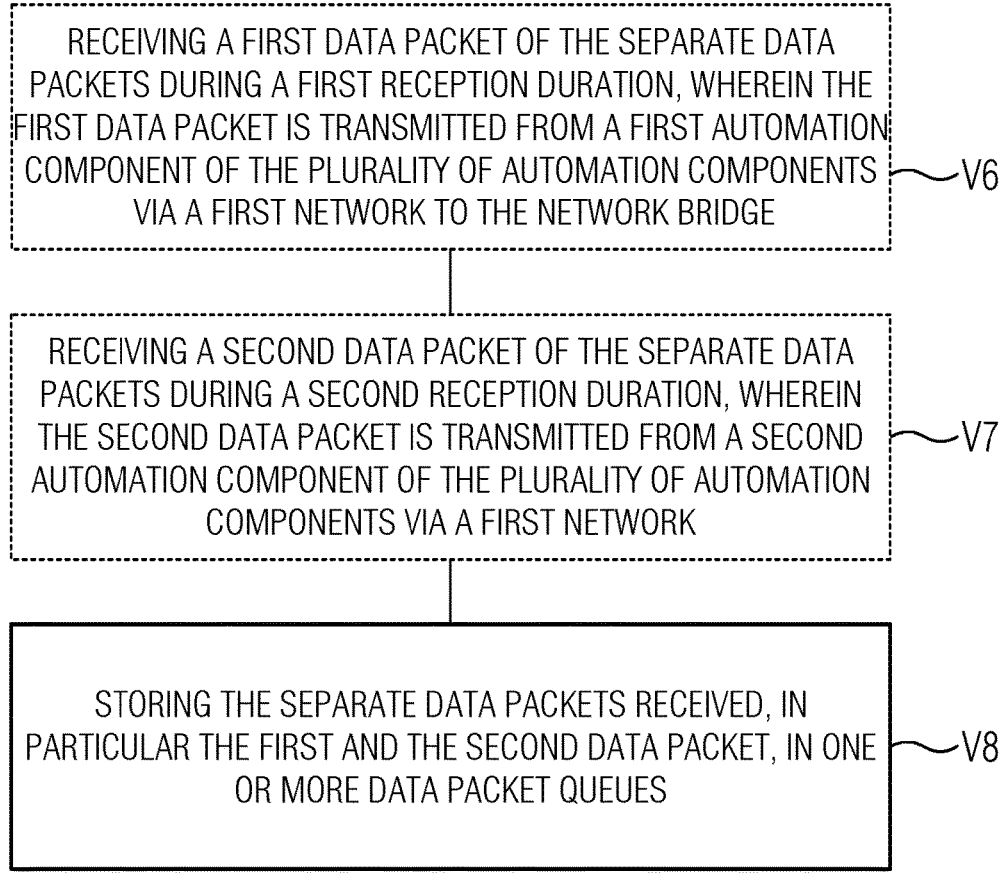
Figure 13:
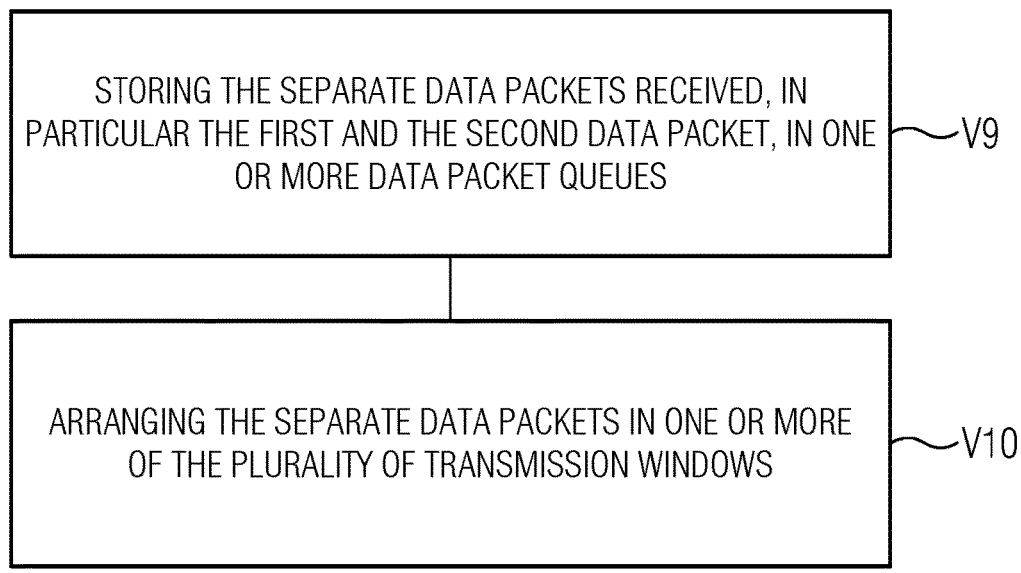

In FIGS. 12 and 13 further acts specifying reception and transmission of data packets by a network bridge are depicted. In an act V6 the first data packet is received during a first reception duration. The first data packet is transmitted from a first automation component. Transmission may take place via the first network N1 in which the automation component and the bridge are located. Then the act V7 a second data packet is received during a second reception duration. The second data packet is transmitted from a second automation component via the first network N1. The reception duration refers to a reception duration of a network bridge connected to the first network N1. The respective reception duration of network bridge N1 may correspond to the transmission slots shown in FIG. 3. After reception of one or more data packets the separate data packets received are stored in one or more data packet queues in the act V8. There may be an individual data packet queue for each data packet type.

In an act V9 separate data packets are stored in one or more data packet queues. Storing of the data packets may be in combination with acts V6 to V8 or independent thereof. In the act V10 the separate data packets are arranged in one or more of the pluralities of transmission windows. The plurality of transmission windows may belong to a data packet stream S originating at a network bridge B.

Figure 14:
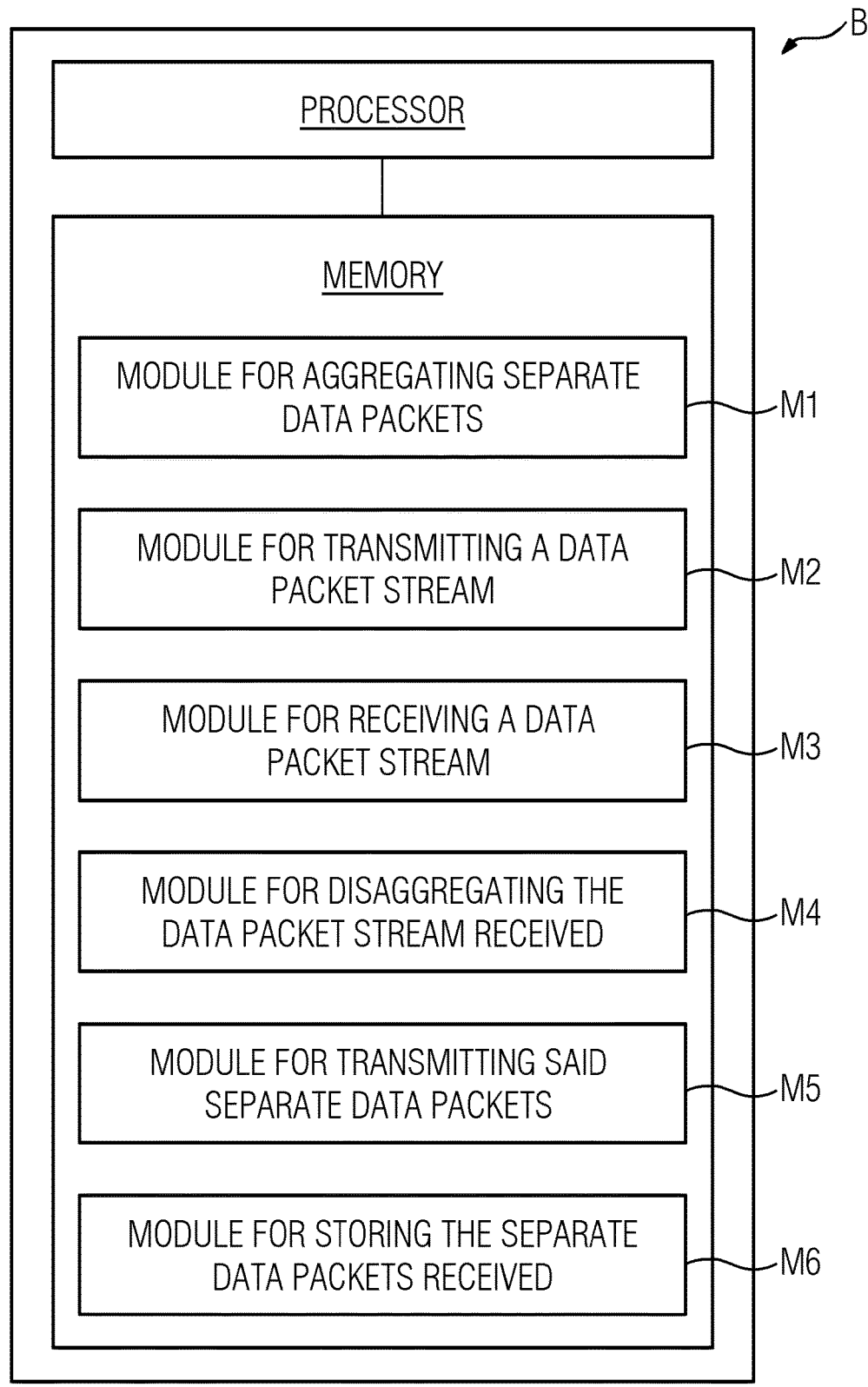
FIG. 14 depicts an exemplary structure of a network bridge for improved data packet transmission.

In FIG. 14 example structures of a bridge B are depicted. The network bridge may include a processor and a memory for performing one or more of the acts as described above, for example in connection with any one of FIGS. 10 to 13. The processor may be operative to perform acts as defined in different modules of its memory. The memory may include a first module M1 for receiving one or more data packets, for example from an automation component of the network N1. As mentioned in the above, the automation component may be a terminal network device, a process device, such as a sensor, actor or other control and/or monitoring device. The memory may include a second module M2 for transmitting a (single) data packet stream, including e.g. the separate data packets received beforehand.

Furthermore, the bridge B may include a module M3 for receiving a data packet stream, e.g. from another network bridge, for example in the second network. A module M4 may be included in the memory and executed by the processor (as well as the other modules as well), the module M4 may serve for disaggregating the data packet stream received. The result of the disaggregation may be separate data packets having different destinations within the first network. A module M5 may serve for transmitting the separate data packets to their respective destinations in the first network.

Still further, a module M6 for storing the separate data packets, e.g. for storing the data packets in one or more queues, for example before aggregation of the data packets into a single data packet stream may be provided. However, the process of storing the one or more separate data packets in one or more queues and/or in the memory may already be part of the step of aggregating the one or more data packets. The module M6 may also be used for storing the one or more data packets after they have been disaggregated. Thus, after storing the one or more separate data packets, the separate data packets are transmitted on the first network to their respective destination.

In an embodiment, a data carrier, e.g. a computer program product, is provided that includes any one or both of a computer program for executing any one of the acts or combinations of acts as described above. The data carrier may be one of an electronic signal, an optical signal, a radio signal, and a computer readable medium. Any one, some or all of the computer programs may thus be stored on the computer readable medium. Non-limiting examples of the data carrier being a computer-readable medium is a memory card or a memory stick, a disc storage medium such as a CD or DVD, a mass storage device. The mass storage device may be based on hard drive(s) or Solid State Drive(s) (SSD). The mass storage device may be such that is used for storing data accessible over a computer network, e.g. the Internet or a Local Area Network (LAN).

Any one, some or all of the computer programs may furthermore be provided as a pure computer program or included in a file or files. The file or files may be stored on the computer-readable medium and e.g. available through download e.g. over the computer network, such as from the mass storage device via a server. The server may e.g. be a web or File Transfer Protocol (FTP) server. The file or files may e.g. be executable files for direct or indirect download to and execution on one or more network bridges. The file or files may also or alternatively be for intermediate download and compilation involving the same or another processor to make them executable before further download and execution causing the network bridge to perform the method(s) as described above. Note that any processor mentioned in the foregoing may be implemented as a software and/or hardware module, e.g. in existing hardware and/or as an Application Specific integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the network bridge or the further network bridges, and/or the automation component to be configured to and/or to perform the above-described methods, respectively.

As used herein, the term "memory" may refer to a hard disk, a magnetic storage medium, a portable computer diskette or disc, flash memory, random access memory (RAM) or the like. Furthermore, the memory may be an internal register memory of a processor.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for improved data packet transmission in a network bridge, the method comprising:
   aggregating separate data packets received from a plurality of automation components into a first data packet stream, wherein the first data packet stream comprises a plurality of transmission windows that correspond to at least one class measurement interval;
   arranging the separate data packets of the first data packet stream in one or more of the plurality of transmission windows; and
   transmitting the separate data packets to at least one of a network bridge and a network node.

2. The method of claim 1, further comprising:
   receiving a second data packet stream from the network node, the second data packet stream comprising data packets destined for the plurality of automation components;
   disaggregating the second data packet stream received into separate data packets; and
   transmitting the separate data packets to the plurality of automation components.

3. The method of claim 1, further comprising:
   receiving a first data packet of the separate data packets during a first reception duration, wherein the first data packet is transmitted from a first automation component of the plurality of automation components via a first network to the network bridge.

4. The method of claim 3, further comprising:
   receiving a second data packet of the separate data packets during a second reception duration, wherein the second data packet is transmitted from a second automation component of the plurality of automation components via the first network.

5. The method of claim 4, wherein reception of the first and the second data packet in the first network occurs in a cyclic manner according to a preconfigured application cycle.

6. The method of claim 3, wherein reception of one or more separate data packets in the first network occurs according to time slots assigned to the plurality of automation components in the first network.

7. The method of claim 3, wherein reception of one or more separate data packets in the first network occurs unsynchronized.

8. The method of claim 1, further comprising:
   storing separate data packets received in one or more data packet queues.

9. The method of claim 1, wherein the first data packet stream comprises a plurality of cyclically repeating transmission windows, and wherein the step of aggregating further comprises:
   arranging the separate data packets in one or more of the plurality of cyclically repeating transmission windows.

10. The method of claim 2, wherein transmission, reception, or transmission and reception of the first data packet stream, the second data packet stream, or the first data packet stream and the second data packets stream occurs via a second network that is different than first network according to cyclically repeating transmission windows for data packets, and wherein the cyclically repeating transmission windows correspond to an application cycle.

11. The method of claim 10, wherein the application cycle corresponds to an integer multiple of time slots in the first network or the application cycle corresponds to an integer multiple of transmission windows in the second network.

12. The method of claim 10, further comprising:
   determining an identifier of each of the separate data packets received via a first network, the identifier indicating an automation component from which the data packet is transmitted, and
   aggregating the separate data packets based on the respective identifier in the first data packet stream.

13. The method of claim 2, further comprising:
   determining an identifier of each of the separate data packets received in the second data packet stream via the second network, the identifier indicating an automation component to which the data packet is destined, and
   transmitting the separate data packets to the respective automation component based on the identifier determined.

14. A network bridge for improved data packet transmission the network bridge comprising:
   a memory configured to receive and store separate data packets from a plurality of automation components; and
   a processor configured to aggregate the separate data packets into a first data packet stream wherein the first data packet stream comprises a plurality of transmission windows that correspond to at least one class measurement interval, arrange the separate data packets of the first data packet stream in one or more of the plurality of transmission windows and transmit the separate data packets to at least one of a network node and a network bridge.

15. A non-transitory computer implemented storage medium, having machine-readable instructions stored therein, that when executed by at least one processor, cause the processor to:
   aggregate separate data packets received from a plurality of automation components into a first data packet stream, wherein the first data packet stream comprises a plurality of transmission windows that correspond to at least one class measurement interval;

arranging the separate data packets of the first data packet stream in one or more of the plurality of transmission windows; and transmit the separate data packets to at least one of a network node and a network node.

16. The non-transitory computer implemented storage medium of claim 15, further comprising program code that when executed performs:

receiving a second data packet stream from the network node, the second data packet stream comprising data packets destined for the plurality of automation components;

disaggregating the second data packet stream received into separate data packets; and transmitting the separate data packets to the plurality of automation components.

17. The non-transitory computer implemented storage medium of claim 15, further comprising program code that when executed performs:

receiving a first data packet of the separate data packets during a first reception duration, wherein the first data packet is transmitted from a first automation component of the plurality of automation components via a first network to the network bridge.

18. The non-transitory computer implemented storage medium of claim 17, further comprising program code that when executed performs:

receiving a second data packet of the separate data packets during a second reception duration, wherein the second data packet is transmitted from a second automation component of the plurality of automation components via the first network.

19. The non-transitory computer implemented storage medium of claim 18, wherein reception of the first and the second data packet in the first network occurs in a cyclic manner according to a preconfigured application cycle.

20. The non-transitory computer implemented storage medium of claim 17, wherein reception of one or more separate data packets in the first network occurs according to time slots assigned to the plurality of automation components in the first network.

* * * * *

UNITED STATES PATENT AND TRADEMARK OFFICE
CERTIFICATE OF CORRECTION

| | |
|---|---|
| PATENT NO. | : 10,819,535 B2 |
| APPLICATION NO. | : 16/217556 |
| DATED | : October 27, 2020 |
| INVENTOR(S) | : Chen et al. |

Page 1 of 1

It is certified that error appears in the above-identified patent and that said Letters Patent is hereby corrected as shown below:

On the Title Page

Item (71) and (72), Line 3:
"Welden (DE)"
Should be replaced with:
"Velden (DE)"

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*